United States Patent Office 2,731,475
Patented Jan. 17, 1956

2,731,475

METHOD OF PRODUCING LACTONES

John C. Hillyer and James T. Edmonds, Jr., Bartlesville, Okla., assignors to Phillips Petroleum Company, a corporation of Delaware No Drawing. Application December 3, 1951,
Serial No. 259,738

9 Claims. (Cl. 260—343.3)

This invention relates to a method of producing lactones. In one of its more specific aspects this invention relates to substituted and unsubstituted lactones of cis-cyclohexanol-2-acetic acid. In another of its more specific aspects it relates to a method of producing said lactones. In another of its more specific aspects this invention relates to a method for the production of the lactone of cis-cyclohexanol-2-acetic acid resulting from the condensation of butadiene, furfural and water.

By the various aspects of this invention, at least one of the following objects will be obtained. An object of this invention relates to a new and novel method of producing lactones of substituted and unsubstituted cis-cyclohexanol-2-acetic acid. A further object of this invention relates to a process wherein the condensation product of butadiene, furfural and water is subjected to successive steps of hydrogenation and oxidation. A further object of this invention is a new process for the oxidation of substituted and unsubstituted hydrogenated lactones having the structural formula

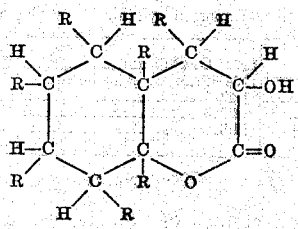

where R is selected from the group consisting of H, CH₃, C₂H₅, C₃H₇ and C₄H₉, not more than two R groups being alkyl to produce compounds having the structural formula

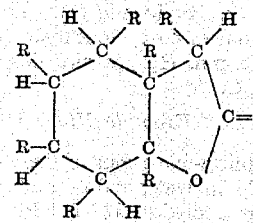

Other objects of the present invention will be apparent to those skilled in the art upon reading the accompanying disclosure.

In accordance with one embodiment of our invention the lactone of cis-cyclohexanol-2-acetic acid is produced from furfural, by first condensing furfural with butadiene and water to form a lactone and then by hydrogenating a lactone so-produced followed by oxidation of the hydrogenated lactone product. In this condensation reaction one molecule each of furfural, butadiene and water react together to form a lactone having the formula

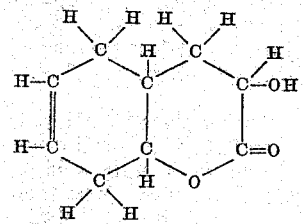

This compound is a solid, crystalline material. The hydrogenation of this lactone is best carried out in the presence of a hydrogenation catalyst, by which term we mean to include any catalyst active in promoting the addition of free hydrogen to the unsaturated carbon to carbon linkage. Various well known hydrogenation catalysts are metals such as palladium, zirconium, nickel, cobalt, copper, thorium, iron, and the like. Metal hydrogenation catalysts such as those above named are generally applied in a finely divided state, and can be supported, if desired. Further known hydrogenation catalysts are molybdenum oxide, chromium oxide, copper chromite, and nickel chromite.

Temperatures for this hydrogenation step are generally in the range from 60° F. to 300° F., preferred temperatures being generally within the limits of 60° F. to 150° F. Above 300° F. undesirable side reactions occur, particularly hydrogenolysis, and furthermore, control of the reaction is difficult.

In carrying out the hydrogenation step, the lactone material is preferably dissolved in an inert solvent. Although it is generally preferable to have the lactone reactant completely dissolved in the selected solvent, complete solution is not an absolute requisite. It is often convenient to employ a saturated solution of crystals in the inert solvent, the presence of any undissolved crystals being immaterial, since under such conditions we have found them to be easily hydrogenated. Preferred solvents used in the hydrogenation step include cyclohexanol, dioxane, methanol, and ethanol.

In one embodiment, we conduct the hydrogenation step at a temperature above the melting point of the lactone starting material, i. e. in the range of about 280–300° F. and thereby eliminate the need for a solvent. However, for most accurate control of the hydrogenation reaction, we prefer to use the inert solvent and operate within the preferred temperature range.

Hydrogenation pressure is necessarily sufficiently high to maintain the solution of lactone in liquid phase at hydrogenation temperature. Generally, a pressure as high as from 20 to 100 p. s. i. g. is preferred. However, when desired, an operating pressure as high as 800–1000 p. s. i. g. may be employed but at pressures above about 1000 p. s. i. g., the hydrogenation is difficult to control, and extensive undesirable side reactions occur.

This hydrogenation step is more fully described in our U. S. Patent No. 2,551,675, issued May 8, 1951, said patent covering the use of the butadiene, furfural, water condensation product under reaction conditions resulting in the production of adipic acid. In that patent we disclose a process wherein the hydrogenated lactone is subjected to drastic oxidation. In the present invention different oxidizing conditions are employed, this process resulting in the production of the lactone of cis-cyclohexanol-2-acetic acid.

Thus, in one embodiment of this invention cis-3-hydroxy-3,4,4a,5,8,8a-hexahydro-1,2-benzopyrone is hydrogenated to produce the corresponding lactone, cis-3-hydroxy - 3,4,4a,5,6,7,8,8a - octahydro-1,2-benzopyrone, and this compound is oxidized under the conditions hereinafter described to produce the lactone of cis-cyclohexanol-2-acetic acid.

The method of oxidation of this invention is also applicable to various substituted, hydrogenated lactones, or 1,2-benzopyrones such as cis-3-hydroxy-5-methyl-3,4,4a,5,6,-7,8,8a - octahydro-1,2-benzopyrone, cis-3-hydroxy-5,6,-dimethyl - 3,4,4a,5,6,7,8,8a-octahydro-1,2-benzopyrone, cis-3 - hydroxy -5-methyl-8-butyl-3,4,4a,5,6,7,8,8a-octahydro-1,2-benzopyrone, cis-3-hydroxy-4a-propyl-7-methyl-3,4,4a-5,6,7,8,8a - octahydro - 1,2 -benzopyrone, cis-3-hydroxy-4-methyl-3,4,4a,5,6,7,8,8a-octahydro-1,2-benzopyrone, and the like.

The mild oxidizing agent employed in the present invention is preferably an alkali metal dichromate in the presence of sulfuric or acetic acids. Propionic and butyric acids can also be used. When conditions of time and temperature are suitably controlled, such oxidizing agents will result in the formation of the lactone of cis-cyclohexanol-2-acetic acid. Stronger oxidation should be avoided in order to avoid undesirable side reactions such as the formation of adipic acid and other more highly oxidized products. The common alkali metal dichromates, such as sodium, potassium, and lithium dichromates are preferred, and these may be employed using hydrated salts, such as sodium dichromate with two molecules of water of hydration, $Na_2Cr_2O_7 \cdot 2H_2O$. In order that the oxidation proceed only to the formation of the desired lactone, a ratio not in excess of one mol of dichromate per mol of lactone starting material is employed. Lower ratios reduce the yield and, with higher ratios, at least a portion of the desired lactone will be further oxidized to adipic acid.

The mixture of alkali metal dichromate and sulfuric acid in which the ratio of dichromate to acid is in the ratio of 1:1 to 1:10, preferably 1:1.3 to 1:2 on a weight basis can be employed. In this ratio, the quantity of sulfuric acid is given as 100 per cent $H_2SO_4$. The preferred ratio of water to the total weight of dichromate plus 100 per cent sulfuric acid will be in the range of 1:1 to 10:1 parts by weight. In some instances more water may be employed depending on other conditions. The reaction temperature is in the range of 30–150° F., preferably 60–125° F., and still more preferably less than 100° F. At lower temperatures the rate of oxidation is much slower, while at higher temperatures larger quantities of undesired by-products are usually formed. When eight to ten parts water are used temperatures in the higher ranges, say 130° F. to 150° F., are used, while with one to three parts water, temperatures of from 30° F. to 50° F. are preferred. A reaction time of 1 to 24 hours, preferably 2 to 8 hours, is employed. It is usually preferred within the ranges specified that a reaction time in the lower part of the range be employed with a reaction temperature in the upper part of the range and vice versa. It is also usually preferred to add the oxidizing mixture to the hydrogenated lactone in increments since an exothermic reaction is involved. The rate of addition and cooling must be so adjusted as to maintain the reaction temperature within the desired range.

In another embodiment, the oxidation reaction is carried out by employing an alkali metal dichromate in the presence of acetic acid as the reaction medium. In this case, the ratio of dichromate to acid is preferably in the ratio of 1:1 to 1:10 on a weight basis.

Conventional recovery procedures can be employed such as extracting the product from the reaction mixture in an organic liquid, separating the extract, drying, and removing the solvent by distillation.

One lactone which we have made by the method of our invention is the same as has been described in the literature in an article by Newman et al. appearing in the Journal of the American Chemical Society, volume 67, pages 233–237 (1945).

Our invention is illustrated by the following examples. The reactants, their proportions, and other specific ingredients are presented as being typical and should not be construed to limit the invention unduly.

*Example I*

Forty-six grams of the hydrogenated lactone, $C_9H_{14}O_3$, prepared according to our U. S. Patent 2,551,675, and 50 ml. water were placed in a 1-liter three-necked flask fitted with a stirrer, and a solution of 81.6 grams of hydrated sodium dichromate in 100 grams of concentrated sulfuric acid with 200 ml. water was added gradually over a period of 5 hours. The reacting mixture warmed up to 50° C. (122° F.) during addition of the oxidizing agent.

After addition of the sulfuric acid-sodium dichromate solution was completed, the reaction mixture was stirred for one hour and then extracted with benzene. The benzene solution was neutralized with sodium bicarbonate, filtered and dried over anhydrous sodium sulfate. The solution was distilled to remove the benzene and a fraction comprising 13.0 grams of a clear liquid, boiling at 124° C. under 8 mm. pressure was recovered. The compound had a refractive index at 20° c. $(n_D^{20})$ of 1.4790 and a specific gravity $(d_4^{20})$ of 1.0912.

A time-temperature cooling curve gave a long flat at 12.8° C. The saponification equivalent of this liquid was found to be 142. Carbon and hydrogen analysis of this compound gave 68.71 per cent carbon and 8.75 per cent hydrogen with 22.54 per cent oxygen by difference (theoretical 68.5 per cent carbon, 8.6 per cent hydrogen, and 22.8 per cent oxygen). This data includes a compound with the formula $C_8H_{12}O_2$ and a molecular weight of 140.

Oxidation of 1.5 grams of this material with 5 ml. concentrated nitric acid at 70–80° C. gave 0.17 gram of adipic acid identified by melting point, and mixed melting point with a known sample of adipic acid.

The final constants of this compound show that this is the lactone of cis-cyclohexanol-2-acetic acid as reported by Newman. The comparison is made in the following table:

| Data | Reported by Newman et al | Product of Example |
|---|---|---|
| Boiling point | 112° C. @ 6 mm.<br>128–128.5° C. @ 10–11 mm. | 124° C. @ 8 mm. |
| $n_D^{20}$ | 1.4773 | 1.4790. |
| $d_4^{20}$ | 1.0923 | 1.0912. |
| Melting point, ° C. | 14.8 | 12.8. |

*Example II*

Twenty-two grams of the hydrogenated lactone $C_9H_{14}O_3$, 100 ml. water, 52.5 grams hydrated sodium dichromate, and 69 grams of concentrated sulfuric acid were mixed at 32° F. This mixture was allowed to stand 15 hours at 32° F. Following extraction with ether, 2 grams of the lactone of cis-cyclohexanol-2-acetic acid was recovered. At 2 mm. Hg pressure this material boiled at 92° C. to 93° C.

*Example III*

A mixture of thirty-five grams of the hydrogenated lactone $C_9H_{14}O_3$, 100 ml. water and 81 grams of concentrated sulfuric acid were cooled to 32° F. Fifty-nine grams of hydrated sodium dichromate and 100 ml. water were added, with stirring, the temperature being maintained between 32° F. and 50° F.

After 15 hours at this temperature, the mixture was extracted with ether and the ether extract washed with sodium bicarbonate solution and distilled water. Following drying, 1.3 grams of the lactone of cis-cyclohexanol-2-acetic acid was recovered. At 15 mm. Hg pressure this material boiled at 135° C. to 137° C.

The residue contained 0.5 gram of white, crystalline acidic material which melted at 65° C. to 69° C. This apparently is 2-ketocyclohexane acetic acid, the reported melting point of which is 72.6° C. to 74.0° C.

Thus, this invention discloses a new method for the production of substituted and unsubstituted lactones of cis-cyclohexanol-2-acetic acid. The starting material for use in this process is obtained in an extractive distillation process employing furfural as a selective solvent in the recovery of butadiene from a butene-butadiene hydrocarbon mixture.

As many possible embodiments may be made of this invention without departing from the scope thereof, it is to be understood that all matter herein set forth is to be interpreted as illustrative and not in a limiting sense.

We claim:

1. A method for the production of the lactone of a cis-cyclohexanol-2-acetic acid comprising oxidizing a compound of the formula

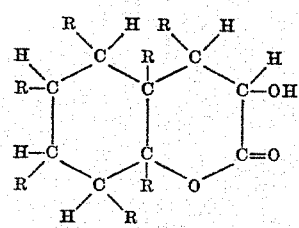

where R is selected from the group consisting of H, CH₃, C₂H₅, C₃H₇, and C₄H₉, not more than two R groups being alkyl, with an alkali metal dichromate present in not in excess of a mol/mol ratio in the presence of an acid selected from the group consisting of H₂SO₄ and monocarboxylic organic acids containing 2 to 4 carbon atoms in aqueous solution at a temperature of from 30 to 150° F., employing a reaction time of 1 to 24 hours, and recovering as a product a compound having the formula

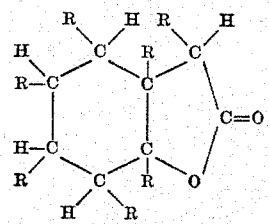

where R is selected from the group consisting of H, CH₃, C₂H₅, C₃H₇, and C₄H₉, not more than two R groups being alkyl.

2. The method of claim 1 in which the acid is CH₃COOH.

3. The method of claim 1 in which the acid is H₂SO₄.

4. The method of claim 1 in which the acid is used in an amount to give a dichromate-acid ratio of 1:1.3 to 1:2 parts by weight.

5. A method for the production of the lactone of cis-cyclohexanol-2-acetic acid comprising oxidizing

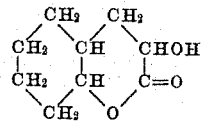

by an alkali metal dichromate present in not in excess of a mol/mol ratio in the presence of an acid selected from the group consisting of H₂SO₄ and monocarboxylic organic acids containing 2 to 4 carbon atoms in aqueous solution at a temperature of from 30° F. to 150° F., employing a reaction time of 1 to 24 hours, and recovering resultant

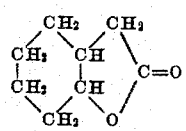

6. The process of claim 5 in which the ratio of dichromate to acid is in the range of 1:1 to 1:10 parts by weight based on 100 per cent H₂SO₄; and the ratio of water to total weight of dichromate and 100 per cent H₂SO₄ is in the range of 1:1 to 10:1 parts by weight.

7. The process of claim 6 in which the dichromate-acid ratio is 1:1.3 to 1:2, the oxidation is carried out at a temperature in a range from 60° F. to 125° F. and a reaction time of two to eight hours is employed.

8. The process of claim 7 in which the oxidation is carried out at a temperature of above 60° F. and below 100° F.

9. A method for the production of the lactone of cis-cyclohexanol-2-acetic acid comprising subjecting cis-3-hydroxy-3,4,4a,5,6,7,8,8a-octahydro-1,2-benzopyrone to oxidation in the presence of an acetic solution of an alkali metal dichromate, said dichromate being present in not in excess of a mol/mol ratio based on said cis-3-hydroxy-3,4,4a,5,6,7,8,8a-octahydro-1,2-benzopyrone, the temperature of said oxidation step being maintained below 100° F.; and recovering the lactone of cis-cyclohexanol-2-acetic acid as a product of the process.

References Cited in the file of this patent

UNITED STATES PATENTS 2,551,675    Hillyer et al. _____ May 8, 1951